(12) United States Patent
Sharpe

(10) Patent No.: US 9,819,797 B2
(45) Date of Patent: Nov. 14, 2017

(54) METHODS AND SYSTEMS FOR INBOUND CALL CONTROL

(71) Applicant: Kedlin Company, LLC, Bellevue, WA (US)

(72) Inventor: Benjamin Sharpe, Bellevue, WA (US)

(73) Assignee: KEDLIN COMPANY, LLC, Bellevue, WA (US)

( * ) Notice: Subject to any disclaimer, the term of this patent is extended or adjusted under 35 U.S.C. 154(b) by 0 days.

(21) Appl. No.: 15/337,811

(22) Filed: Oct. 28, 2016

(65) Prior Publication Data

US 2017/0048388 A1 Feb. 16, 2017

Related U.S. Application Data

(63) Continuation-in-part of application No. 14/552,267, filed on Nov. 24, 2014, now Pat. No. 9,491,286.
(Continued)

(51) Int. Cl.
*H04M 1/56* (2006.01)
*H04M 15/06* (2006.01)
(Continued)

(52) U.S. Cl.
CPC ..... *H04M 3/4365* (2013.01); *H04M 3/42059* (2013.01); *H04M 3/42153* (2013.01);
(Continued)

(58) Field of Classification Search
CPC ...... H04M 3/4365; H04M 1/57; H04M 1/663; H04M 1/665; H04M 2203/2005; H04M 3/436; A01B 12/006
(Continued)

(56) References Cited

U.S. PATENT DOCUMENTS

| 6,813,344 | B1 | 11/2004 | Lemke |
| 7,027,569 | B2 * | 4/2006 | Price ...... H04M 1/663 379/201.02 |

(Continued)

*Primary Examiner* — Binh Tieu
(74) *Attorney, Agent, or Firm* — Ascenda Law Group, PC

(57) ABSTRACT

An indication of an incoming call may be received at a call control unit communicatively coupled to, and/or resident within, a telephone. The indication may include identification information for the incoming call. It may be determined whether additional information regarding a caller associated with the identification information exists, and if so, a first operation may be performed on the incoming call responsively to the additional information, otherwise, a second operation may be performed on the incoming call responsively to an absence of the additional information. The additional information my include a user-configurable list of desired callers (e.g., a whitelist) and/or undesired callers (e.g., a blacklist). The additional information may also include caller identification information and/or a spam score. The first operation may be blocking the incoming call, forwarding the incoming call to a voice mailbox, transmitting the incoming call to the telephone, enabling the telephone to receive the incoming call, and/or answering the incoming call and then terminating the incoming call. In some embodiments, the first and/or second operations performed on the incoming call is/are user configurable.

25 Claims, 15 Drawing Sheets

Related U.S. Application Data which is a continuation of application No. 14/038,396, filed on Sep. 26, 2013, now Pat. No. 8,917,843.

(60) Provisional application No. 61/715,076, filed on Oct. 17, 2012.

(51) Int. Cl.
*H04M 3/436* (2006.01)
*H04M 3/42* (2006.01)
*H04M 3/533* (2006.01)

(52) U.S. Cl.
CPC ........ *H04M 3/436* (2013.01); *H04M 3/53308* (2013.01); *H04M 2203/6072* (2013.01)

(58) Field of Classification Search
USPC ........... 379/88.19, 88.2, 88.21, 93.17, 93.23, 379/142.01, 142.02, 142.04, 142.06, 379/142.17, 201.01, 201.02, 207.13, 379/207.15, 210.02, 210.03, 211.02
See application file for complete search history.

(56) References Cited

U.S. PATENT DOCUMENTS

| | | | |
|---|---|---|---|
| 7,162,019 B1 | 1/2007 | Mullis et al. | |
| 7,212,620 B1 | 5/2007 | Mastro | |
| 7,263,178 B1 | 8/2007 | Brother et al. | |
| 7,623,634 B2 | 11/2009 | Benco et al. | |
| 8,090,088 B2 | 1/2012 | Mullis et al. | |
| 8,300,775 B2 | 10/2012 | Millett et al. | |
| 8,363,803 B2 | 1/2013 | Gupto | |
| 8,577,002 B2 | 11/2013 | Stein et al. | |
| 8,625,762 B1 | 1/2014 | White et al. | |
| 8,634,520 B1* | 1/2014 | Morrison | H04M 3/436 370/241 |
| 8,660,246 B1 | 2/2014 | Brown | |
| 8,694,915 B2 | 4/2014 | Cadiz et al. | |
| 9,003,545 B1 | 4/2015 | Oliver | |
| 9,014,359 B1 | 4/2015 | Pfeffer et al. | |
| 9,060,057 B1* | 6/2015 | Danis | H04M 3/42059 |
| 9,078,113 B1 | 7/2015 | Brown | |
| 2006/0188081 A1 | 8/2006 | Hooper et al. | |
| 2008/0175174 A1* | 7/2008 | Altberg | G06Q 30/02 370/259 |
| 2009/0080624 A1 | 3/2009 | Small et al. | |
| 2010/0049526 A1* | 2/2010 | Lewis | G10L 15/22 704/273 |
| 2012/0128144 A1 | 5/2012 | Chislett et al. | |
| 2013/0097697 A1* | 4/2013 | Zhu | G06F 21/36 726/18 |
| 2014/0330568 A1* | 11/2014 | Lewis | G10L 15/22 704/273 |
| 2014/0348312 A1 | 11/2014 | Martino et al. | |
| 2015/0264174 A1 | 9/2015 | Brown | |

\* cited by examiner

METHODS AND SYSTEMS FOR INBOUND CALL CONTROL

RELATED APPLICATION

This application is a CONTINUATION-IN-PART of U.S. application Ser. No. 14/552,267 filed on Nov. 24, 2014, which is a CONTINUATION of U.S. application Ser. No. 14/038,396, which has matured into U.S. Pat. No. 8,917,843 filed 26 Sep. 2013 which is a NON-PROVISIONAL of and claims priority to U.S. Application No. 61/715,076, filed 17 Oct. 2012, the contents of each are incorporated herein by reference.

FIELD OF INVENTION

The present invention relates to methods and systems for controlling inbound calls and, more particularly, relates to methods and systems for evaluating inbound calls according to one or more criterion.

BACKGROUND

Unsolicited and unwanted telephone calls, so-called "telemarketing" or "spam" calls, are received by thousands of people every day at, for example, their residence and/or workplace. The volume of unsolicited and unwanted telephone calls placed has increased dramatically in recent years with the advent of computer dialed "robocalls" which are able to call millions of telephone subscribers in a short period of time at minimum expense. Such calls are an unwelcome intrusion into privacy of the called party. The annoyance caused by spam calls has prompted the Federal Trade Commission (FTC) and Federal Communications Commission (FCC) to generate a "Do Not Call" registry of phone numbers associated with individuals who do not want to receive telemarketing calls and telemarketers are prohibited from calling numbers placed on the Do Not Call registry. The FTC recently hosted a robocall summit with industry stakeholders to help identify solutions to this growing problem.

SUMMARY

Methods, devices, and systems for controlling inbound telephone calls are herein described. An indication of an incoming call may be received at a call control unit communicatively coupled to a telephone. The indication may include identification information for the incoming call. It may be determined whether additional information regarding a caller associated with the identification information exists, and if so, a first operation may be performed on the incoming call responsively to the additional information, otherwise, a second operation may be performed on the incoming call responsively to an absence of the additional information. The additional information may include caller identification information and/or a spam score. The first operation may be blocking the incoming call, forwarding the incoming call to a voice mailbox, transmitting the incoming call to the telephone, enabling the telephone to receive the incoming call, and/or answering the incoming call and then terminating the incoming call (disconnecting the call), to name a few. In some embodiments, the first and/or second operations performed on the incoming call is/are user configurable.

In some embodiments, determining whether additional information regarding a caller is associated with the identification information exists may be performed at the call control unit using information retrieved from a locally accessible data store. In other embodiments, determining whether additional information regarding a caller associated with the identification information exists may comprise forwarding the identification information from the call control unit to a server. The server may be operative to determine whether the additional information regarding a caller associated with the identification information exists. When the additional information exists, the server may receive the additional information regarding the caller associated with the identification information, otherwise an indication that no additional information exists may be received from the server.

In some embodiments, an indication that the incoming call is undesired may be received at the call control unit and the call control unit may communicate the indication to a server. In some instances, the additional information may include a user-configurable list of desired and/or undesired callers and the identification information for the undesired incoming call may be automatically added to the user-configurable list of undesired callers.

BRIEF DESCRIPTION OF THE DRAWINGS

The present invention is illustrated by way of example, and not limitation, in the figures of the accompanying drawings in which.

Figure 1A:
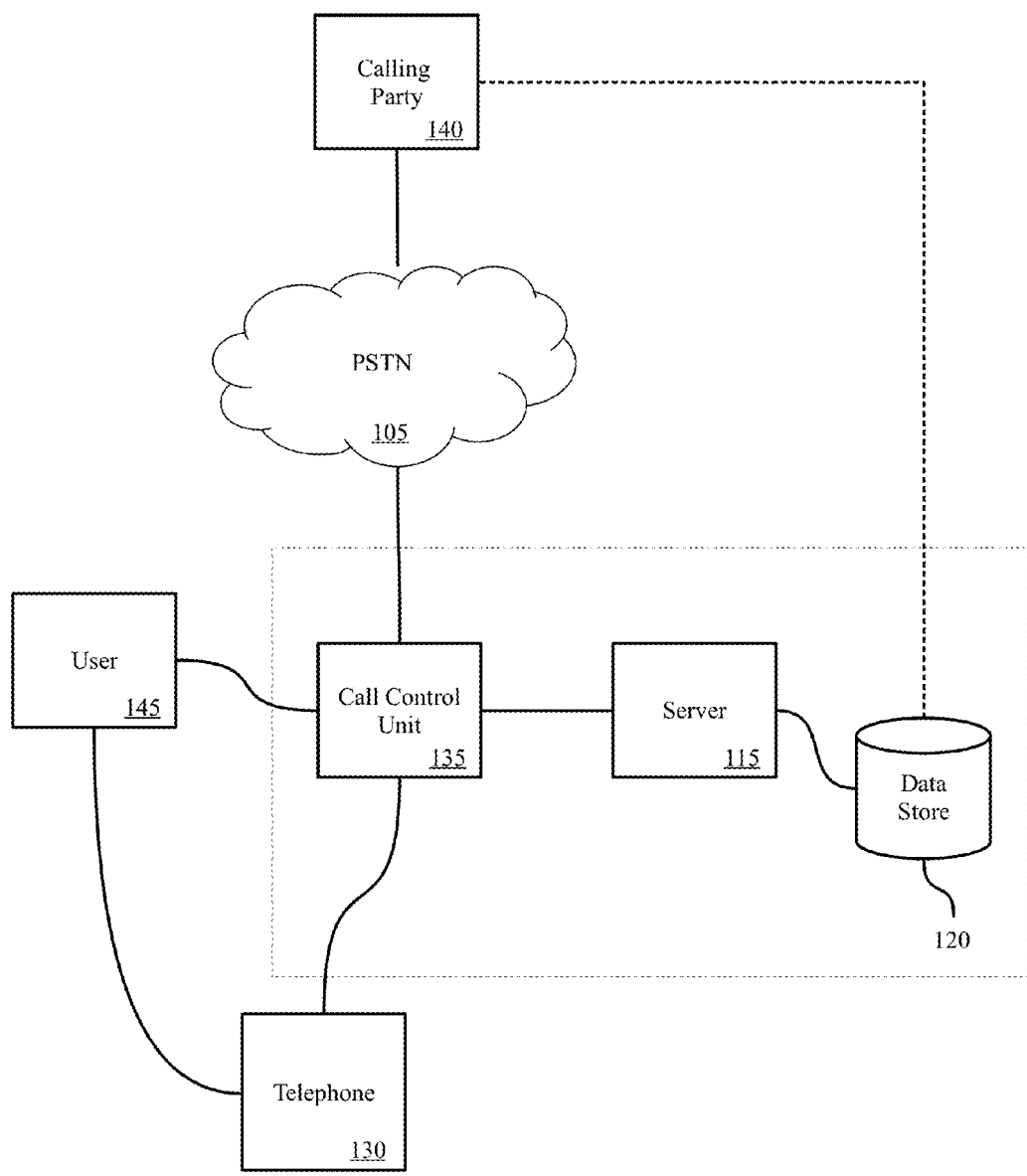
FIGS. 1A, 1B, and 2 are block diagrams of exemplary systems, consistent with an embodiment of the invention.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

WRITTEN DESCRIPTION

Described herein is an exemplary platform and technology for performing intelligent operations on inbound calls, for example, landline and/or VOIP telephone calls to a called phone number. The present methods and systems may be employed in the case of voice calls, text messages and/or other inbound communications to the called phone number. For ease of discussion, throughout the following description, such attempts to contact a user shall be referred to as calls or phone calls. It should be understood that this is not intended to limit the scope of the invention in any way.

Exemplary operations performed on calls include blocking, rejection, redirection (e.g. to a voice mail box or automated message), identification, and an application of privacy controls to an incoming call. The operations may be applied to incoming calls at, for example, the device level (e.g., via a call control unit resident internally or externally to a phone to which an incoming call is directed) and/or at a network or PSTN level.

The present systems and methods source information concerning incoming call and text message activity from a plurality of users, e.g., mobile and landline telephone subscribers, to track activity of unwanted calls and messages (e.g., from spam callers or telemarketers) via, for example, a central database (running on, e.g., a web server) and/or through an API interface that provides a set of features including call blocking, individual blacklisting and whitelisting of phone numbers or caller identifiers, caller identification, call reporting, and other customizable/user selectable features.

Platform Overview

In one embodiment, the technology employs a web service (e.g., EveryCall.us) that sources call-related activity from a plurality of users and information sources. Users may provide call-related information via the Web, via mobile or landline communication devices, at the PTSN level via API or other means. Other information sources may exist at the network level, and/or may include public information e.g., the Federal Do Not Call Registry. In some embodiments, the web service may be located in a hosted environment and provide a secure and unique Application Program Interface (API) which enables a continual data connection between the platform and connected devices which may, in turn, be provided to the plurality of users.

Community Blacklist

Some embodiments of the present invention may provide a community blacklist to users. The community blacklist is a database of identifiers (e.g., telephone numbers, text messaging numbers, and/or caller id name) and related information that is compiled using a proprietary algorithm that analyzes a large volume of call data reported from users and other sources of data to provide up to the minute information about active, unwanted and spam callers and text message senders. The result of this analysis may be a score, sometimes referred to herein as a "spam score."

In some cases, the spam score represents a level of unwanted or spam activity originating from, or associated with, a given phone number or identifier. The score may be scaled using, for example, a scale of 0-100 with 100 being the maximum level of spam activity across the communication network for each identifier. This score is updated continually based on actual activity transpiring on the network.

The spam score algorithm uses, for example, a combination of the following data to identify active unwanted/spam callers who are then added to the community blacklist:

Report velocity (# of reports related to a phone number or caller identification information over a defined period of time).

Credibility of users reporting calls/texts/other unwanted communication. Credibility may be determined by, for example, tracking the credibility of each user based upon a number of factors including number of previously made reports, quality of reports, and number of votes from other users, etc.

Number of calls to users.

Number of users who have added the phone number to a private blacklist over a finite period of time.

Number of users who have added the phone number to a private whitelist over a finite period of time.

Number of calls blocked over a defined period of time.

Number and velocity of reports.

Number of reports from public law enforcement entities such as the FCC Do Not Call registry or State Attorney Generals offices (obtained via, for example, Freedom of Information Act (FOIA) request directly from that agency).

The spam score for phone numbers, caller identification information, and related information that meet a minimum threshold (which may be user defined) are added to the community blacklist which is then transmitted to all connected devices (e.g., mobile, landline, network) on, for example, a real time, periodic, and/or as needed basis. An operation (e.g., call blocking, call forwarding, etc.) may then be applied to, for example, some or all incoming calls and/or text messages associated with community-blacklisted numbers/callers.

Calculation of a score in this manner prevents wrongfully adding non-spam/wanted phone numbers to the community blacklist, in part because it takes more than just one report, factor or element to pass the threshold and classify the number as spam. Calculation of the score in this manner may prevent, for example, a single user, or even a group of users, from wrongfully or maliciously adding numbers or contact information to the community blacklist.

In some embodiments, the community blacklist is continually calculated and updated based on received information. This may be done in real time or on a periodic or continuous basis. In this way, the information on the community blacklist is kept current and when a calculated score for a particular phone number or caller identification no longer meets the threshold, it is removed from the community blacklist and those calls are no longer blocked/operated upon across the platform.

In some instances, the community blacklist and/or information used to calculate the community blacklist may be protected with one or more security protocols including, but not limited to, encryption. The community blacklist and/or information used to calculate the community blacklist may be protected with one or more security protocols wherever they are stored and or used including, but not limited to, server 115, data store 120, and/or call control unit 135.

Call Control Landline Device (Landline)

Figure 1B:
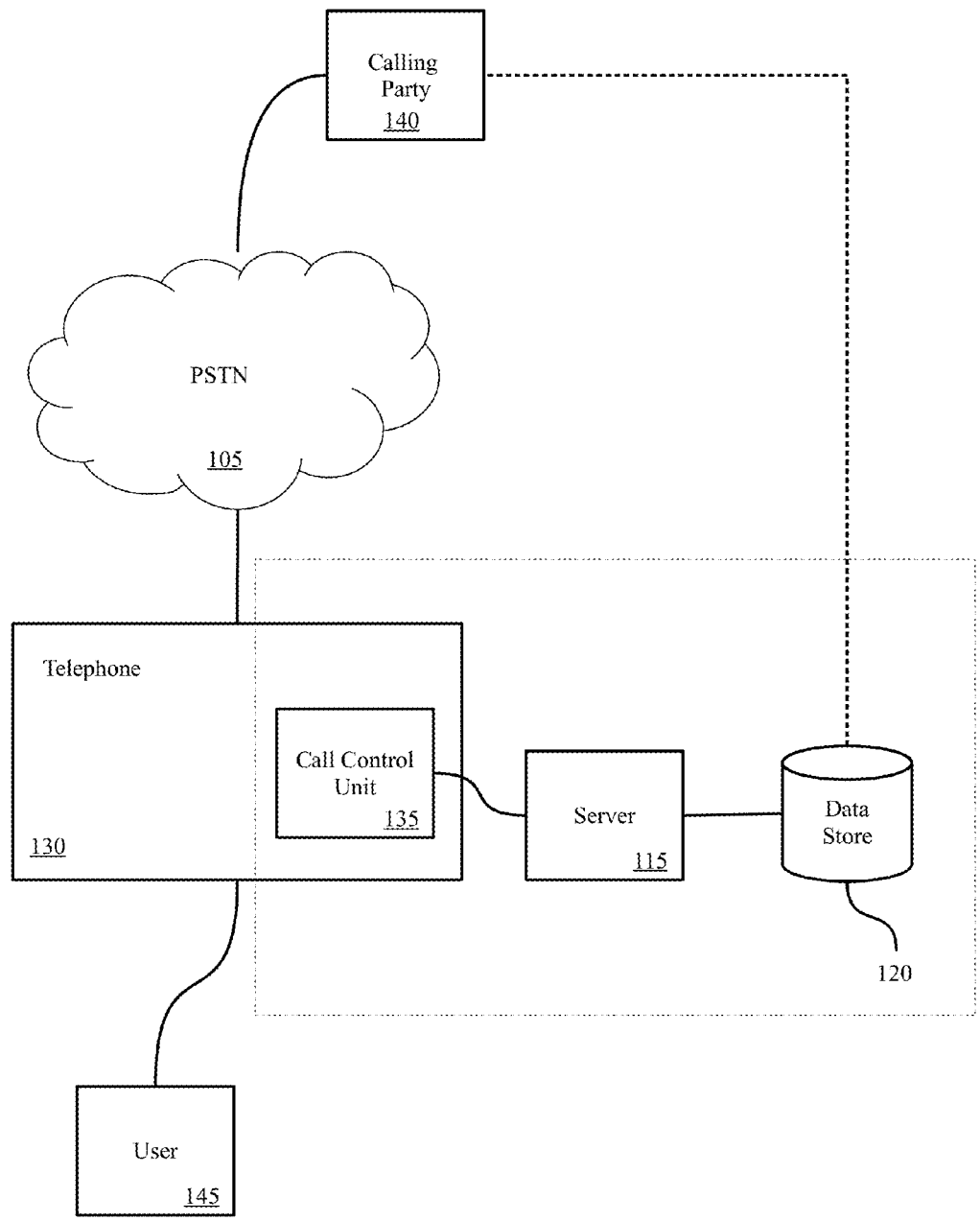
Figure 2:
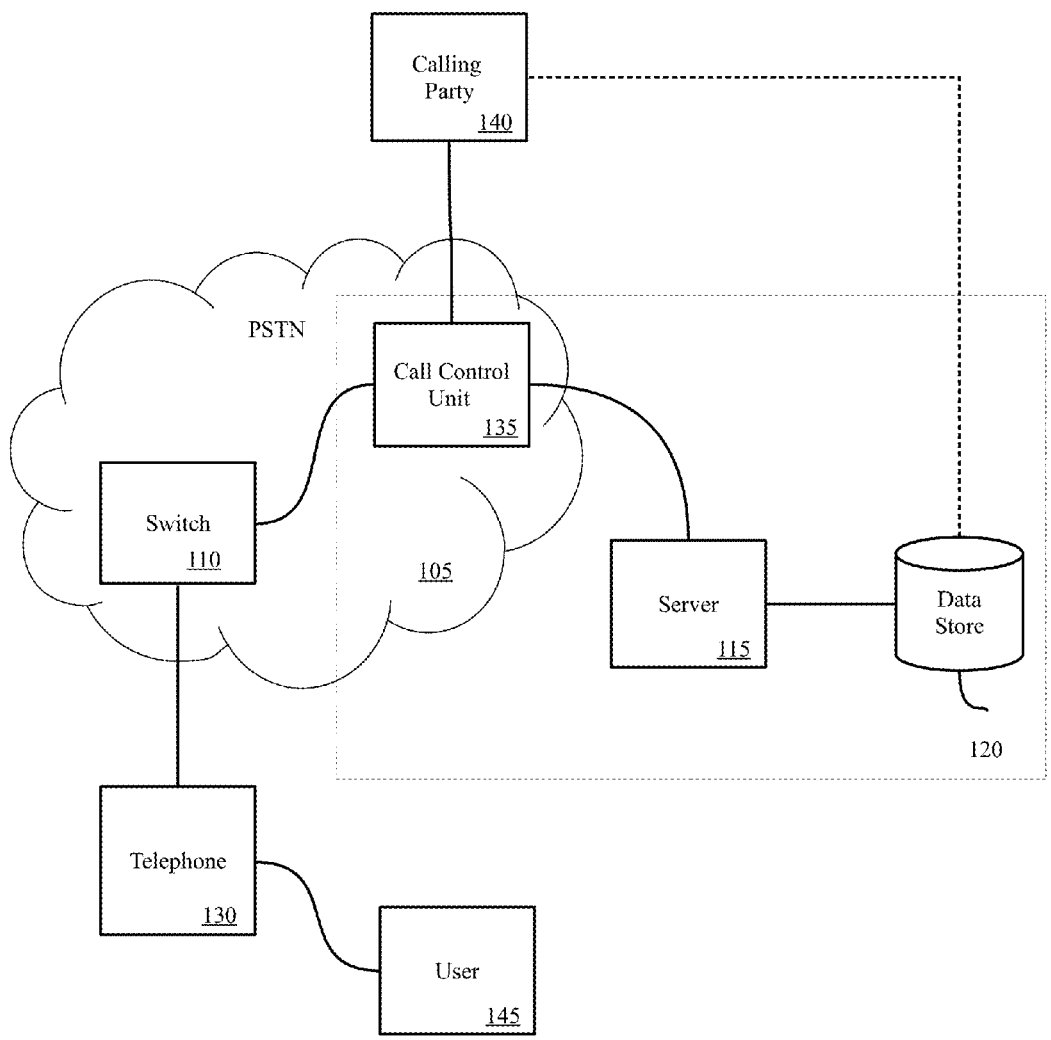

The present invention may be instantiated, in part, in a call control unit 135 as part of exemplary systems 100, 101, and 200 as depicted in FIGS. 1A, 1B, and 2, respectively. Communication between one or more components of systems 100, 101, and/or 200 may be protected by one or more security protocols (e.g., encryption, use of passwords, identification verification, etc.). Additionally, or alternatively, information stored on one or more components of systems 100, 101, and/or 200 may be protected by one or more security protocols.

Call control unit 135 may reside within various components of a system and/or may exist as a stand-alone hardware device. For example, call control unit 135 may be configured to be a stand-alone hardware device communicatively connected between a landline or analog telephone 130 and telephone communication network, such as the public switched telephone network (PSTN) 105 as in system 100 of FIG. 1A or may reside in telephone 130 as depicted in system 101 of FIG. 1B. Call control unit 135 may also be a component of PSTN 105 as in system 200 of FIG. 2

Call control unit 135 may perform one or more operations on incoming calls to the telephone 130. For example, in response to receipt of an inbound call from a calling party 140, the call control unit 135 may communicate with a server 115 that provides information associated with calling party 140, such as the community blacklist (stored on, for example, a data store 120), and/or a user's personal whitelist and blacklist of phone numbers. In FIG. 1, this communication is shown as occurring over PSTN 105; however, in other embodiments a separate data network connection may be used. Upon receipt of the information from server 115, call control unit 135 may perform one or more operations on the incoming call, as described further below.

Call control unit 135 may be user configurable and the user configuration data may be stored, for example, on a data store resident within call control unit 135, on server 115, and/or data store 120. Exemplary user configurations include generation and maintenance of a personal blacklist and/or whitelist of phone numbers or various operations to be performed upon an incoming call based upon, for example, identification information associated with calling party 140. A whitelist of phone numbers may include contact information or phone numbers associated with people/entities the user always wants to receive a phone call from.

User 145 may directly configure call control unit 135 via, for example, a user interface (e.g., buttons or touch screen). User 145 may also configure call control unit 135 via user's phone 130 or via another interface (e.g., a computer or mobile communication device) communicatively coupled to call control unit 135 (e.g., via PSTN 105 or a separate data communication network). Such coupling may be indirect, for example, via a web services interface (e.g., provided by server 115) in which configuration information is specified and later downloaded to call control unit 135. In some embodiments, user 145 may report phone numbers or caller identification information to, for example, server 115 for inclusion in the community blacklist, which may automatically add that caller to the users personal blacklist.

On some occasions, call control unit 135 may be enabled to provide caller identification information to user 145. This identification information may be retrieved from, for example, data store 120. This identification information may be provided in addition to, or instead of, traditionally available caller identification information (e.g., an ANI).

User 145 may also customize the operations performed on an incoming call-by-call control unit 135 according to one or more criteria. For example, the user may configure call control unit 135 to automatically terminate or forward to an automatic message all attempts to communicate with user 145 from callers included on the personal and/or community blacklist.

Other exemplary operations that may be performed by call control unit 135 include:
  Generation and maintenance of a personal blacklist and whitelist of phone numbers and caller identification information.
    Block by area code and wildcards (e.g. 888-237-????).
  Incoming Caller Identification (e.g., call type (telemarketing, survey, junk fax, debt collection, etc.) or caller name.
  Spam call reporting.
  Online backup of settings and lists—restored in the case of device is lost or damaged.
  Blocked call/message log.
  Block Private, Unknown, Restricted, Unavailable Callers.
  Privacy Modes and Scheduling
    Allow whitelist only.
    Allow contacts only.
    Allow contacts and whitelist only.
    Block all calls and texts.
  Community Blacklist
  FCC Do Not Call or other government agency integration
  Call waiting blocking.

The call control unit 135 may intercept incoming calls that are on either the community or personal blacklist (and not on the whitelist) and may perform one or more of the following operations on the incoming call:
  Briefly answer the call and hang-up i.e., pick-up and hang-up or disconnect.
  Withhold the call via hardware relay.
  Send to voicemail.
  Play a recorded message.
  Modify ring to special ring.
  Display enhanced caller id (e.g. "Spam Call").

In many cases the operation may be performed automatically without user's 145 direct knowledge or the ringing of phone 130.

Call Control for Networks (Networks)

The present invention also provides a system for performing operations on calls or attempts to contact user 145 at a network level as shown in system 200 of FIG. 2. In this instance, the operations performed by call control unit 135 may be performed by a call control unit 135 and a switch 110 operating together within, for example, PSTN 105. Call control unit 135 and switch 110 may communicate with server 115 and data store 120 to perform some, or all, of the operations discussed herein at the network level. In this embodiment, the calls or attempts to communicate with user 145 may be operated upon as a service level integration whereby a telephone service provider (e.g., VoIP, analog/traditional, wireless) connects with server 115 and/or data store 120 to obtain information from the platform (e.g., community blacklist, spam score, caller name, report information, ability to submit reports, etc.) in order to provide customized services to the telephone service provider's customer base. It is important to note that in this embodiment, calls are intercepted at the network level thereby eliminating the requirement for any device or software to be implemented or installed by the user.

In summary, upon receiving an indication of an incoming call, a call control unit that is communicatively coupled to a telephone, forwards identification information for the incoming call to a server (or other computer system). The server is operative to determine whether additional information regarding a caller associated with the identification information exists, and, if so, provides same to the call control unit (in some instances, if no such additional information exists, the server sends a response indicating same). Based on and responsive to the information returned from the server (or lack of such information), the call control unit performs an operation on the incoming call. Such an operation may include blocking the incoming call, forwarding the incoming call to a voice mailbox, transmitting the incoming call to the telephone, enabling the telephone to receive the incoming call, and/or answering the incoming call and then terminating the incoming call. Either or both of the operation to be performed and the additional information stored by the server may be user-configurable. In addition, it is important to note that communication between the components of systems 100 and 200 may be facilitated via wired and/or wireless communicative couplings and, in some instance, may take place over a communication network, such as the Internet.

Figure 3:
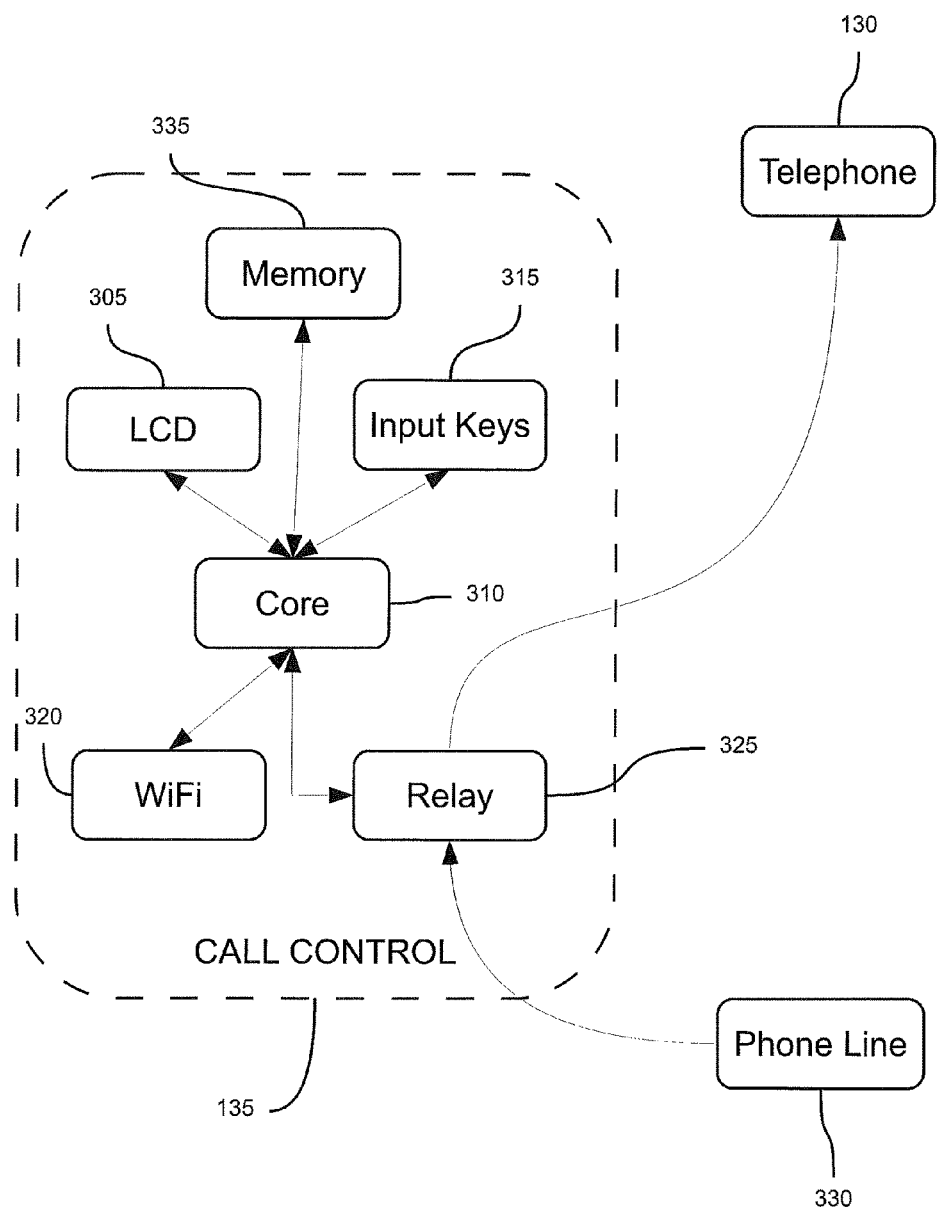
FIG. 3 is a block diagram depicting an exemplary call control unit, consistent with an embodiment of the invention.

FIG. 3 is a block diagram depicting an exemplary call control unit 135. Exemplary call control unit 135 includes a display or LCD 305, a user interface or input keys 315, a Wi-Fi transceiver 320, a memory 335, and a telephone relay 325, all of which may be coupled to a processor core 310. Display or LCD 305 may be any appropriate display device and, in some cases, may be a touch-enabled display. Display or LCD 305 may be configured to display information to a user, such as user 145. Display or LCD 305 may be further configured to receive information from a user, such as user 145, when configured, as is a touch-enabled display. Memory 335 may be configured to store sets of instructions, which when executed by processor core 310, perform one or more of the processes described herein. In addition, memory 335 may record actions executed by call control unit 135 (e.g., call blocking or transmission of spam reports), user configuration settings, and/or a user's blacklist and/or whitelist.

User interface or input keys 315 may be any configuration of input keys (e.g., alpha-numeric, pictographic, and/or arrow keys) by which a user, such as user 145, may input information into call control unit 135. Processor core 310 may be any appropriate processor enabled to execute one or more processes described herein and may control the operation of one or more components of call control unit 135. In some embodiments, processor core 310 may include 64 MB of RAM and 128 MB of re-writable storage. Wi-Fi transceiver 320 may be configured to enable call control unit 135 to communicate with one or more components of system 100 and/or 200. In some embodiments, call control unit 135 may be communicatively coupled to PSTN 105 via a phone line 330 and may receive incoming calls at relay 325 via phone line 330. Relay 325 may be configured to transfer an incoming call to telephone 130 responsively to, for example, instructions from processor core 310. In some embodiments, relay 325 may physically connect phone line 330 to telephone 130. In many cases, the default position for relay 325 will be closed. When a call is received by relay 325 via phone line 330, relay 325 may open thereby preventing telephone 130 from receiving the call until processor core 310 determines whether the incoming call should be transferred to telephone 130. When processor core 310 determines that the incoming call should be transferred to telephone 130, processor core 310 may transmit a command to close to relay 325, which, upon receipt, closes relay 325 thereby enabling the incoming call to be connected to telephone 130. When processor core 310 determines that the incoming call should not be transferred to telephone 130, processor core 310 may transmit a command to keep relay 325 open, which, upon receipt, opens relay 325, or maintains a previously open position, thereby blocking the incoming call from being connected to telephone 130. Alternatively, when relay is maintained in an open position and an incoming call is received that processor core 310 determines should not be connected to telephone 130, processor core 310 may do nothing, thereby maintaining the open position of relay 325.

Figure 4:
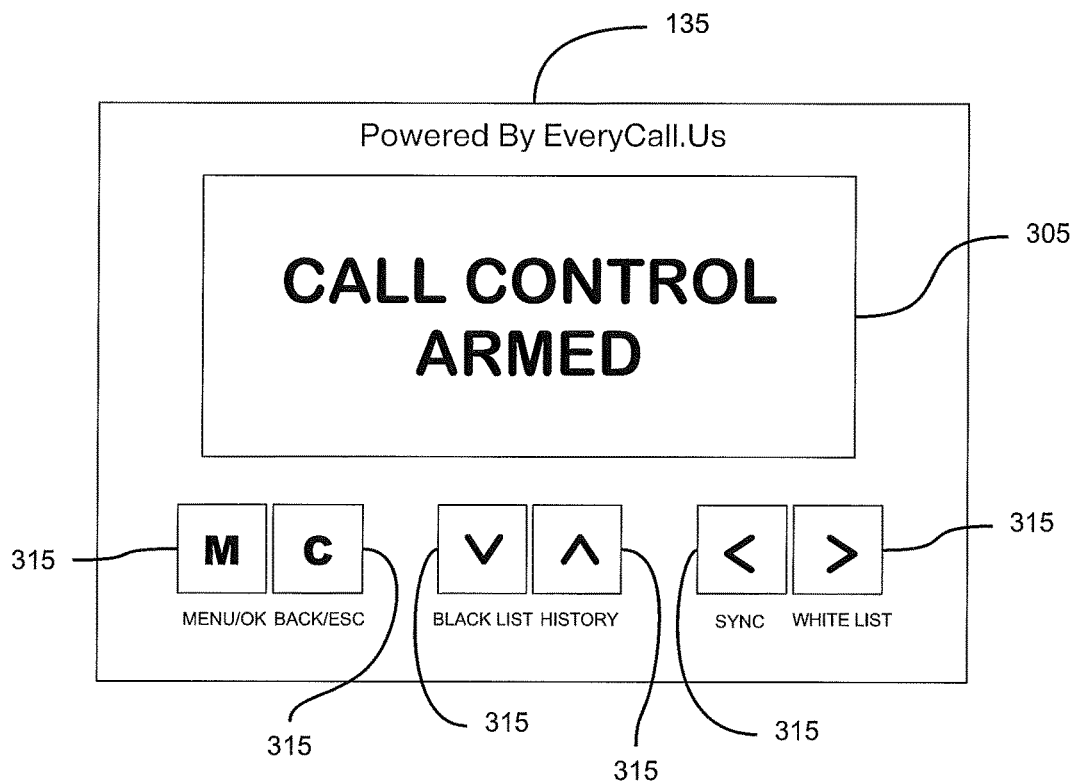
FIGS. 4 and 5 are block diagrams depicting exemplary call control units, consistent with an embodiment of the invention.
Figure 5:
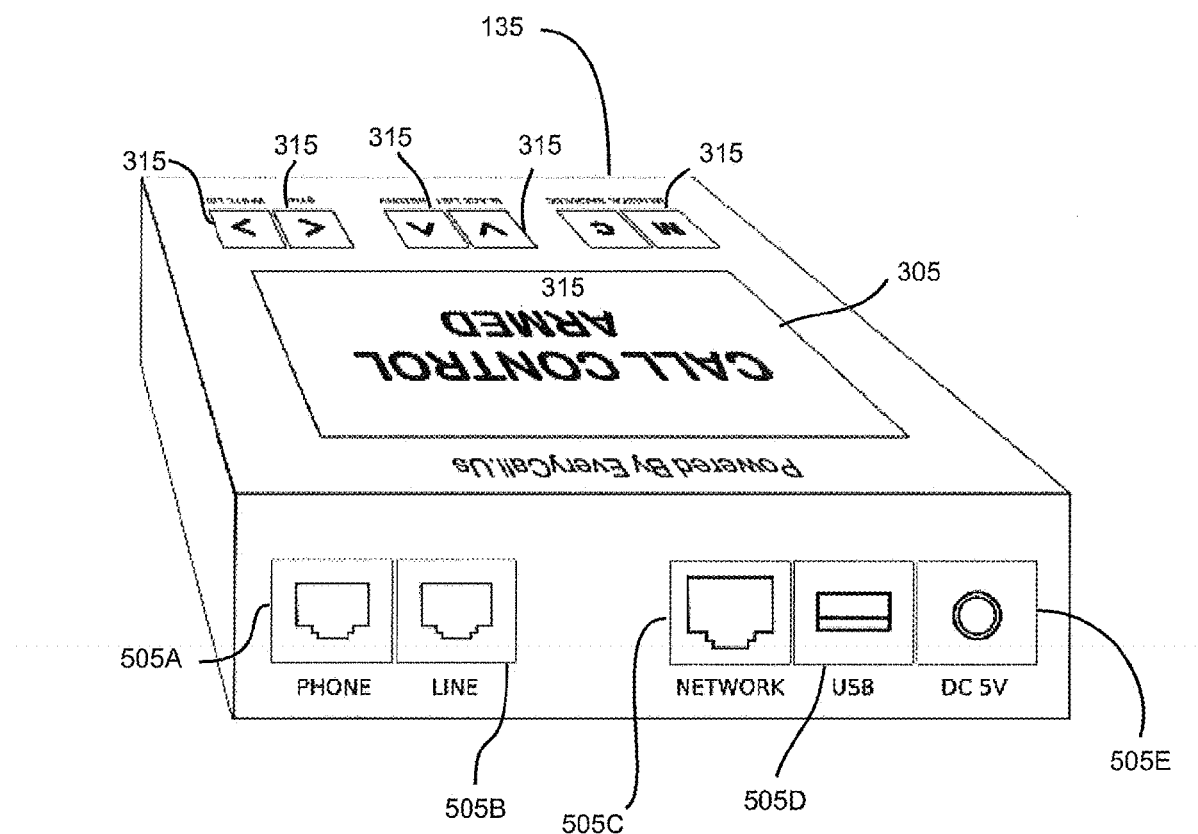

FIG. 4 is a block diagram depicting a top plan view of an exemplary call control unit 135 including display/LCD 305 and multiple input keys 315. FIG. 5 is a side perspective view of an exemplary call control unit 135 including display/LCD 305 and multiple input keys 315, and multiple ports $505_{A-E}$. Multiple ports $505_{A-E}$ may be uni- or bi-directional. Exemplary ports $505_{A-E}$ include phone jack $505_A$, line in $505_B$, network connection $505_C$, USB port $505_D$, Ethernet ports, and power port $505_E$.

Figure 6:
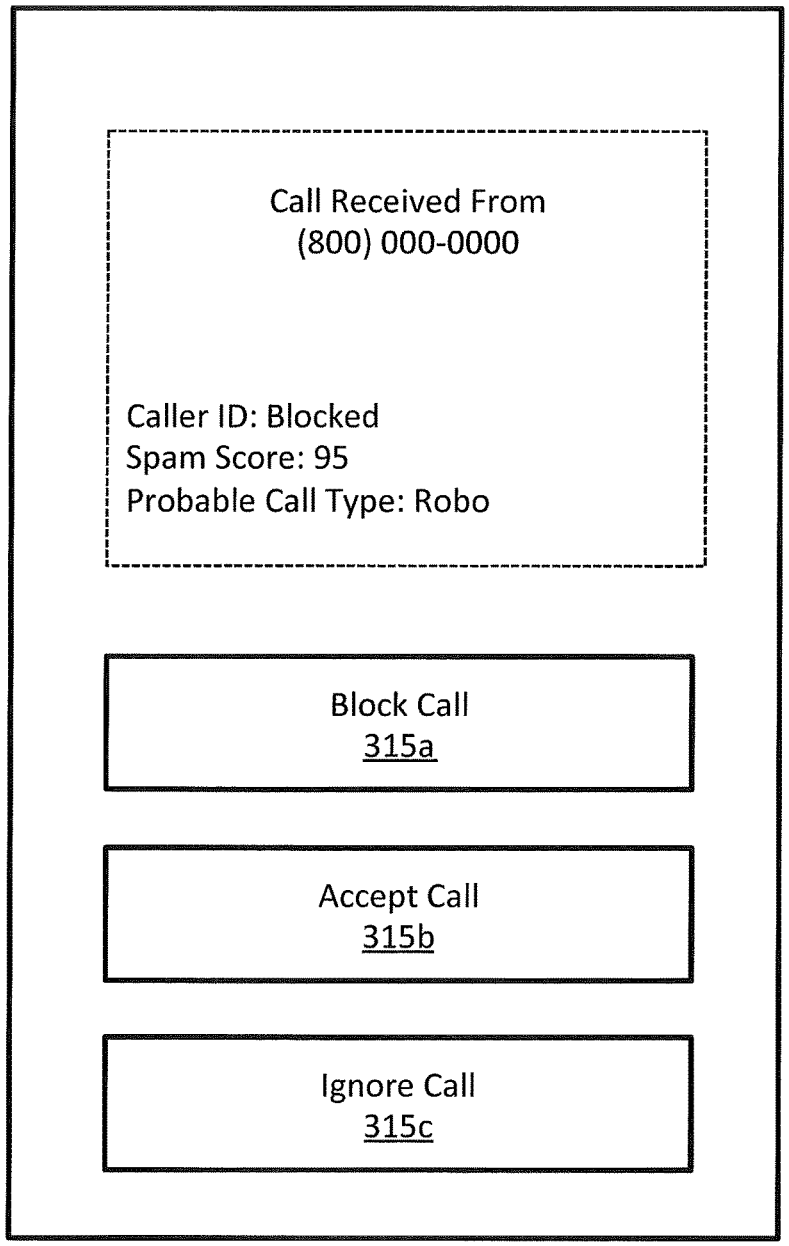
FIG. 6 is a block diagram depicting an exemplary display/LCD, consistent with an embodiment of the invention.

FIG. 6 is a block diagram depicting display/LCD 305 and multiple input keys 315a-c, wherein display/LCD 305 is a touch-enabled display and multiple input keys 315a-c are provided via the touch-enabled display. Selection of input key 315a may enable a user to block a call and, on some occasions, when input key 315a is selected, a blocked call report may be sent to, for example, a server such as server 115. As can be seen in FIG. 6, display/LCD 305 may be enabled to display information regarding an incoming call, such as call type, a spam score, a phone number, and a name associated with the caller.

Figure 7:
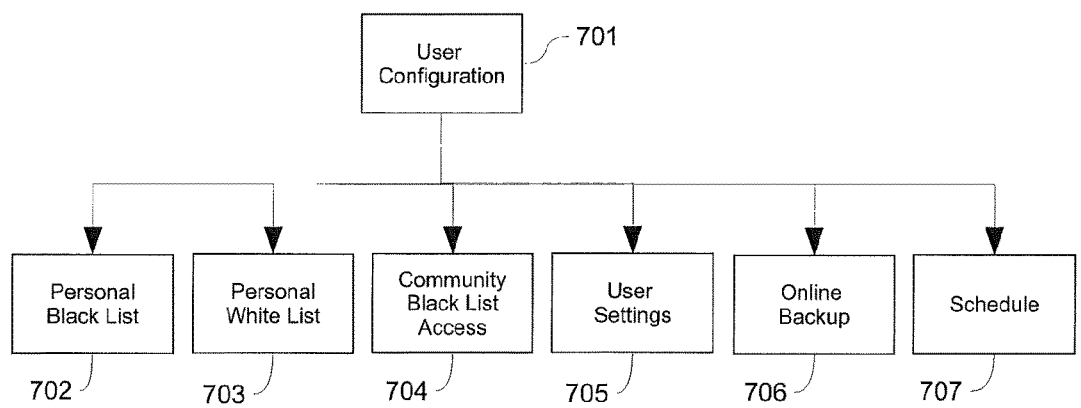
FIG. 7 depicts exemplary settings for a call control unit, consistent with an embodiment of the invention.

Call control unit 135 may be preprogramed with default settings and, in some instances, may be user configurable. FIG. 7 depicts some of the settings for call control unit 135 that may be user configurable 701 by a user, such as user 145. For example, a user may configure a personal blacklist 702 and/or a personal whitelist 703 of phone numbers and/or contact information. The user may establish a preferred configuration for accessing a community blacklist 704 (e.g., full access or partial access). A user may also configure one or more user settings 705 of call control unit 135. Exemplary user settings include display preferences, language preferences, and energy-saving (e.g., sleep setting) preferences. A user may further configure online backup preferences 706. Online backup preferences 706 may serve to establish the frequency (e.g., daily or weekly) at which information stored in call control unit 135 is backed up online. A user may also configure call control unit 135 to perform certain operations according to a schedule. For example, a user may configure call control unit to forward all incoming calls to a voicemail box during certain hours of the day (e.g., at night) or for a period of days as might be the case when the user will be away from call control unit 135 and/or telephone 130 for a period of days (e.g., on vacation).

Figure 8:
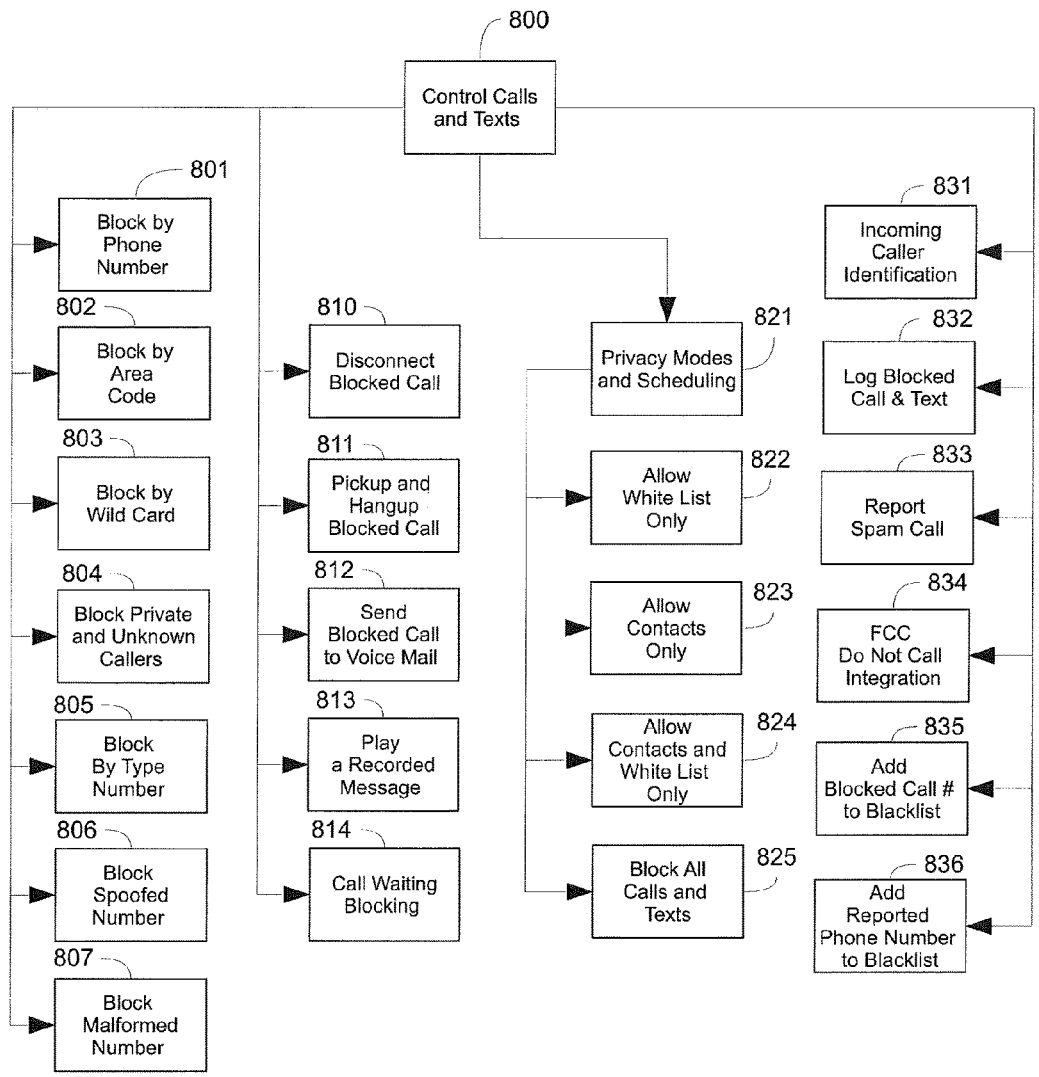
FIG. 8 is a diagram depicting a series of actions call control unit, consistent with an embodiment of the invention.

FIG. 8 is a block diagram depicting a series of actions call control unit 135 may be enabled to execute when controlling incoming calls or messages 800, some of which may be user configurable as discussed above with regard to FIG. 7. Action 801 enables call control unit to block an incoming call according to a phone number associated with the incoming call and calls may be blocked by area code via action 802. Incoming calls may be blocked by wildcard (action 803) and private and/or unknown callers may be blocked (action 804). Incoming calls that are associated with a particular type of phone number may be blocked (action 805) and incoming calls from spoofed or malformed phone numbers for may be blocked (actions 806 and 807, respectively). In some embodiments, call control unit 135 may disconnect a blocked call (action 810), pickup and hang up a blocked call (action 811), or send a blocked call to voicemail (action 812). In other embodiments, call control unit 135 may play a recorded message (action 813) or block call waiting features for an incoming call (action 814).

Call control unit 135 may also execute privacy and scheduling mode actions 821, such as only allowing calls from whitelisted phone numbers to be transferred to a telephone (action 822), only allowing calls from a contact list of phone numbers to be transferred to a telephone (action 823), only allowing calls from a contact list and a whitelist of phone numbers to be transferred to a telephone (action 824), and blocking all calls and texts (action 825).

Call control unit 135 may further identify incoming callers (action 831) and/or log and/or otherwise record blocked calls and/or messages (action 832). Call control unit 135 may also report a phone call identified as a spam call to, for example, a server such as server 115 (action 833). Call control unit 135 may be integrated with the Do Not Call registry of the FCC and FTC (action 834). Further, call control unit may add phone numbers associated with blocked incoming calls to a user's blacklist (action 835) and/or add reported phone numbers to a user's blacklist (action 836).

Figure 9A:
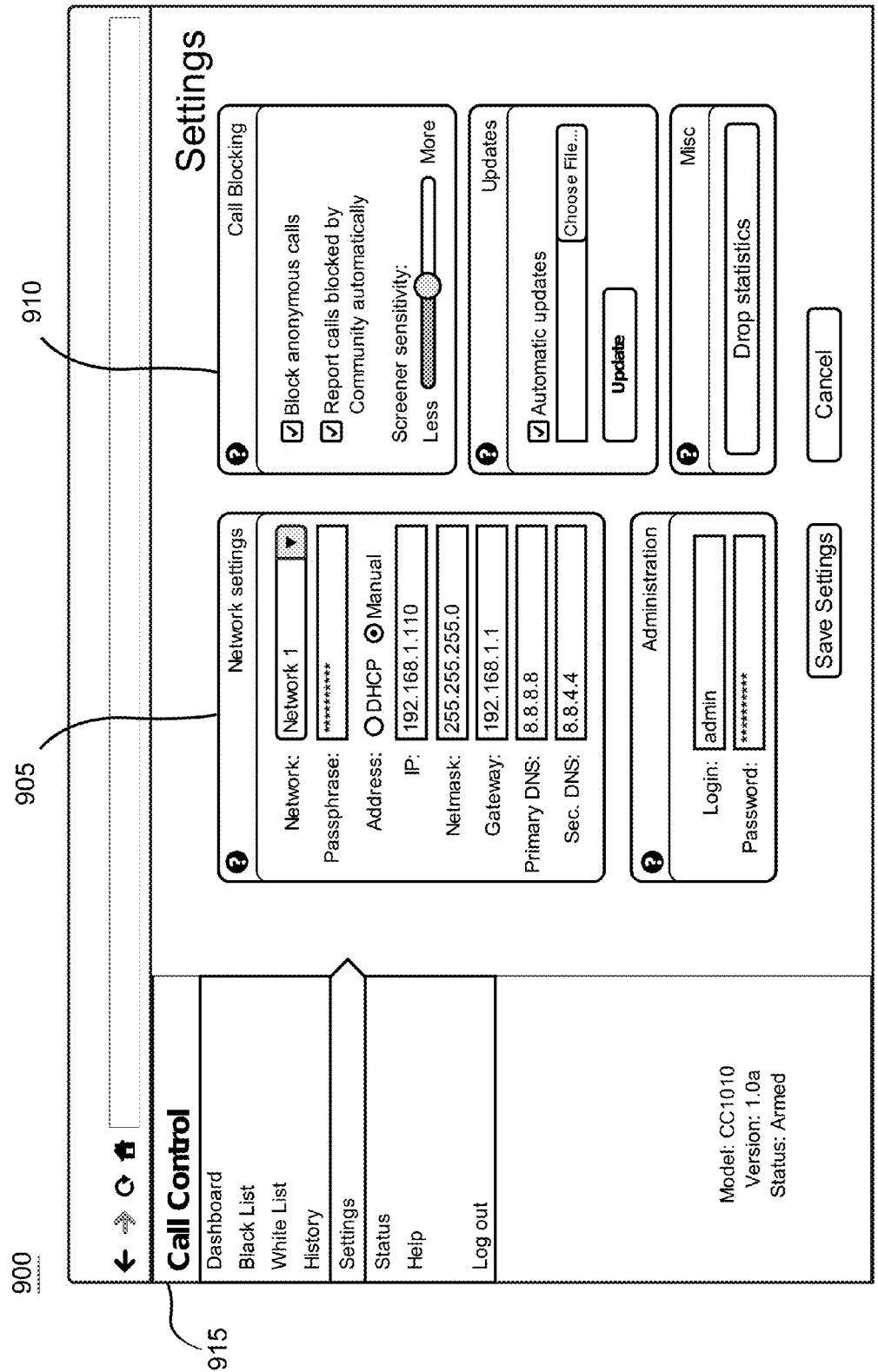
FIGS. 9A and 9B illustrate exemplary user interfaces, consistent with an embodiment of the invention.
Figure 9B:
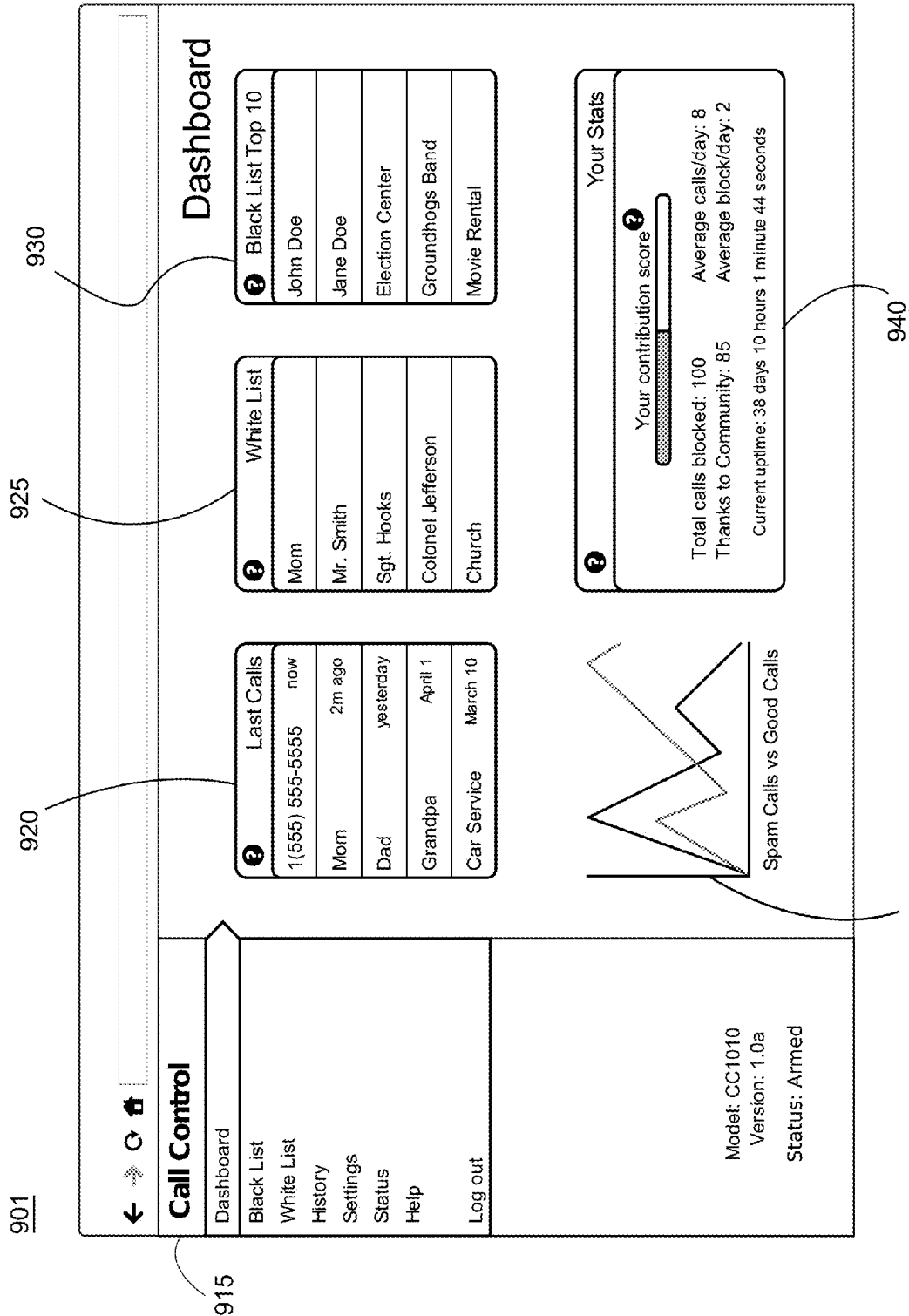

FIGS. 9A and 9B illustrate exemplary user interfaces by which a user, such as user 145, may interact with and/or configure systems 100, 101, 200, and/or any component included therein. For example, user interface 900 of FIG. 9A displays an exemplary set of settings for a call control unit. User interface 900 may be displayed responsively to a user selection of "Settings" from a list of call control configuration information/options 915. User interface 900 may include a network settings window 905. Network settings window 905 may include information regarding various settings (e.g., IP address, gateway ID, primary DNS, secondary DNS, netmask ID, etc.) and some, or all, of these settings may be user configurable or set automatically by default. User interface 910 may further include a call blocking window 910. Included within call blocking window 910 may be user configurable settings for call blocking (block anonymous calls, report blocked calls, etc.) FIG. 9B displays a dashboard user interface 901 including features such as a listing of last calls 920, a white list 925, a black list 930, an infographic 935, and a statistics display 940. Exemplary infographic 935 and statistics display 940 may relate to, for example, incoming call and/or call control activity. One or more of the features of user interface 901 may be interactive so that, for example, when a feature is selected by a user, additional information and/or configuration options related to the feature are displayed (not shown).

Figure 10:
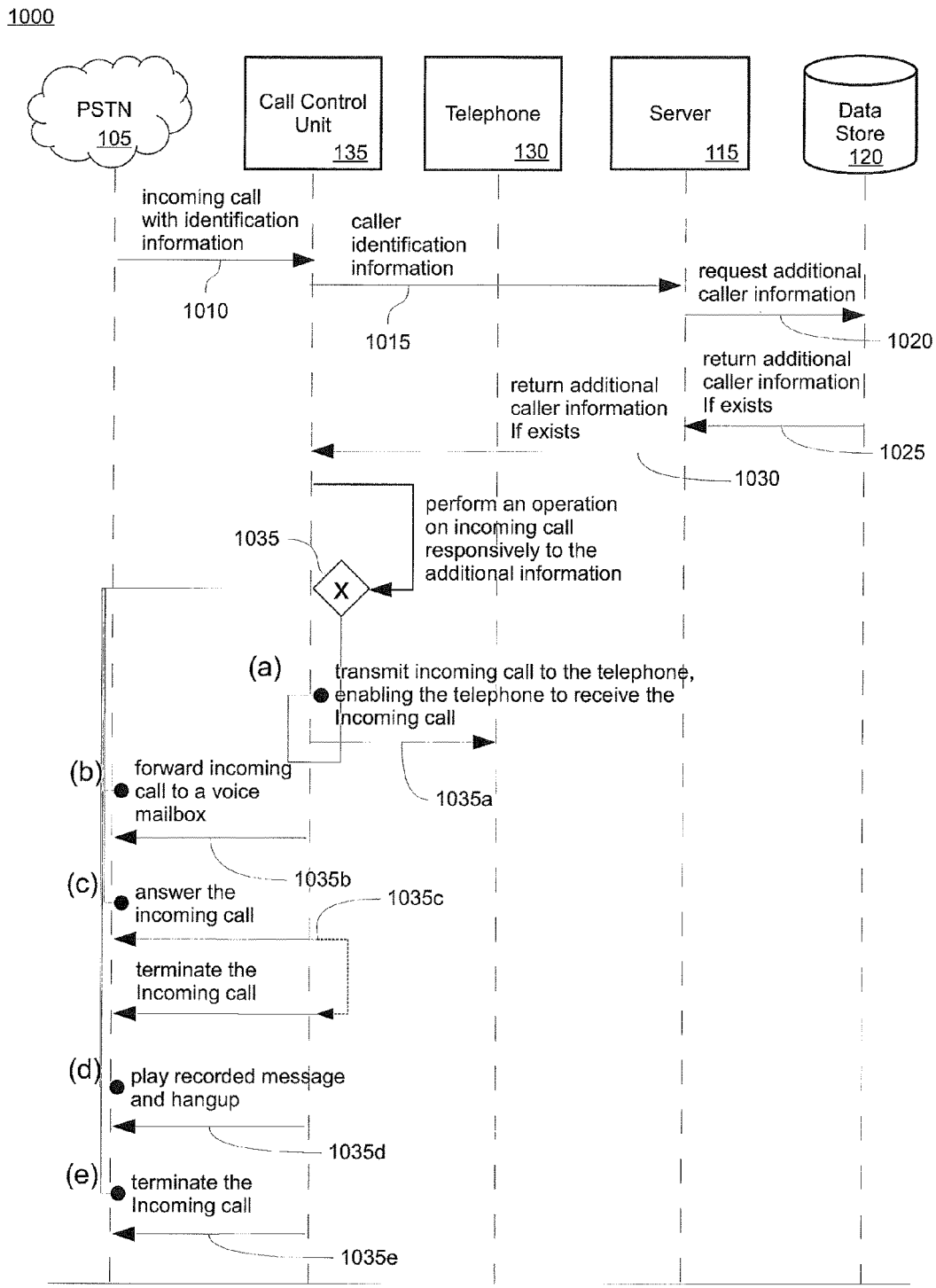
FIGS. 10-12 depict processes, consistent with an embodiment of the invention.

FIG. 10 depicts a process diagram illustrating an exemplary process 1000 for controlling a call. Process 1000 is executed via communication between PSTN 105, call control unit 135, telephone 130, server 115 and data store 120. In some instances, this communication may be protected with a security protocol such as encryption. In step 1010, an incoming call with caller identification received by PSTN 105 may be communicated to call control unit 135. Exemplary caller identification information includes a name of an individual, company, or business entity associated with the incoming call, a time of day at which the call is incoming to the PSTN, and a geographic location associated with the call. The caller identification information may then be communicated to server 115 (step 1015). Server 115 may then request additional caller information from data store 120 (step 1020) and, if the requested information exists (i.e., is stored in data store 120), it is communicated to server 115 (step 1025). Additional caller information may include, for example, whether the caller is associated with a user's blacklist or whitelist or a "do not call list." When the additional information exists, server 115 may communicate it to call control unit 135 (step 1030) which may, in turn, perform an operation on the incoming call responsively to the additional information (step 1035). The operation performed may be one or more of the operations described below with reference to FIG. 11. For example, call control unit 135 may transmit the incoming call to telephone 130 and enable telephone 130 to receive the incoming call (step 1035a). Alternatively, call control unit 135 may forward the incoming call to a voice mailbox (step 1035b) or answer and then terminate the incoming call (step 1035c). Call control unit 135 may also transmit a recorded message to the caller and terminate the incoming call (step 1035d) or simply terminate the incoming call (step 1035e).

Figure 11:
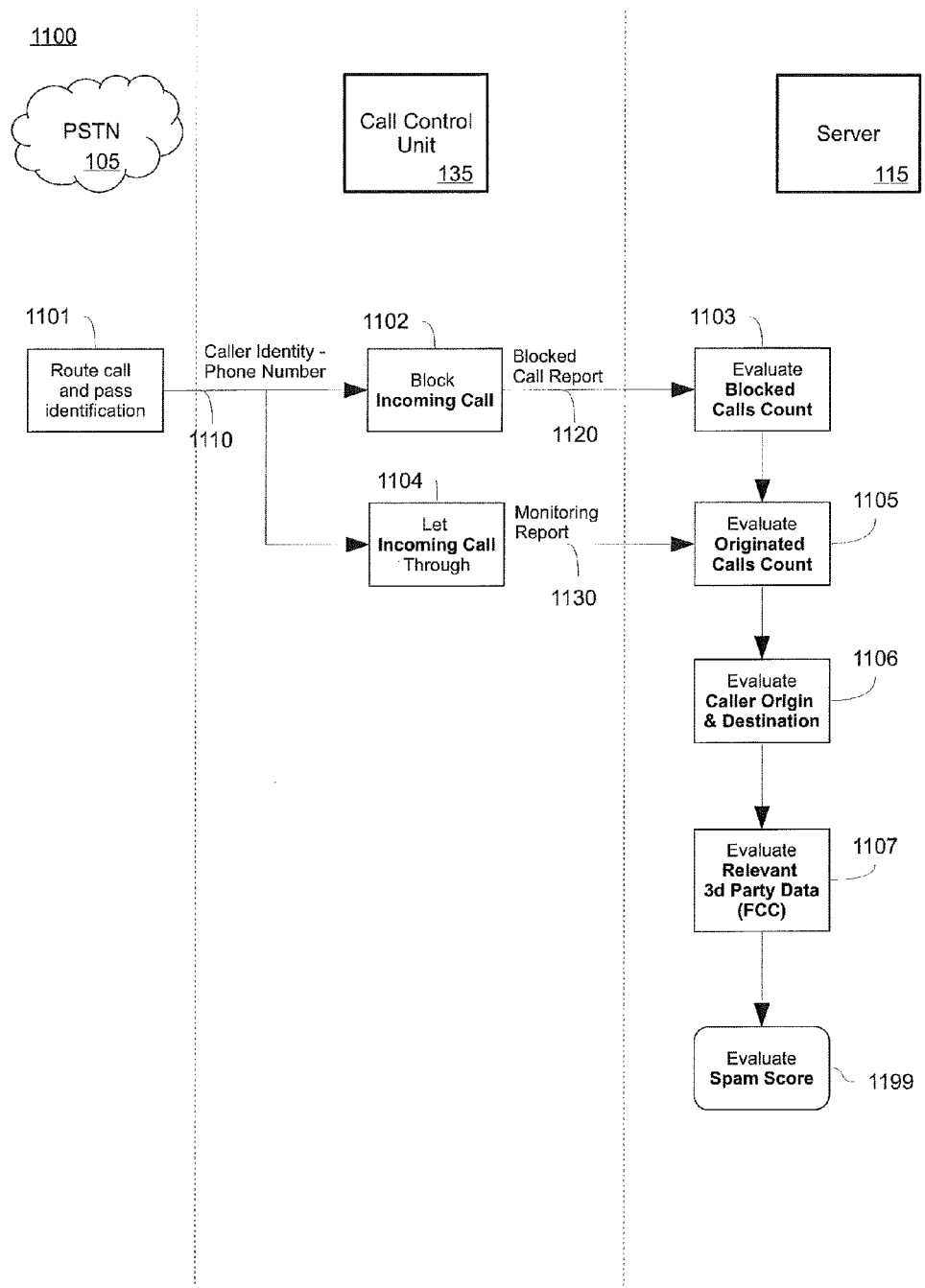

FIG. 11 depicts a process diagram illustrating an exemplary process 1100 for generating a spam score for identification information associated with an incoming call. Process 1100 is executed via communication between PSTN 105, call control unit 135, and server 115. In some instances, this communication may be protected with a security protocol such as encryption. In step 1101, an incoming call and caller identification information is received at PSTN 105 and is routed to call control unit 135 (step 1110). Call control unit 135 then analyzes the incoming call and associated identification information and executes one or more operations on the incoming call such that in step 1102, the incoming call is blocked or at step 1104 the incoming call is let through to, for example a telephone.

When the incoming call is blocked, as in step 1102, a blocked call report may be generated and sent to server 115 (step 1120). Blocked called report may include, for example, configuration settings utilized by call control unit 135 to analyze the incoming call, identification information associated with the incoming call, and/or block the incoming call and/or information relating to the call, the caller, and/or the called party. Next, in step 1103, server 115 may evaluate a blocked calls count for the caller utilizing, for example, the block call report of step 1120 and other information accessible by server 115 relating to the blocked call.

When the incoming call is not blocked, a monitoring report may be generated and sent to server 115 (step 1130). The monitoring report may include, for example, configuration settings utilized by call control unit 135 to analyze the incoming call and/or not block the incoming call and/or information relating to the call, the caller, and/or the called party. Next, and step 1109, server 115 may evaluate an originated calls count for the caller utilizing, for example, monitoring report 1130, blocks call report 1120, and/or other information accessible by server 115 relating to the call.

In step 1106, server 115 may evaluate an origin and/or destination of the caller in order to determine, for example, an entity (e.g., telemarketer or spammer) responsible for placing the call. In step 1107, third-party data relevant to the caller may be collected. Exemplary third-party data includes FCC/FTC Do Not Call Registry information as well as information from other public and/or private sources (e.g., state or local governmental agencies). Server 115 may then determine a spam score for the caller. The spam score may be a representation of a probability that a caller is placing unwanted calls or a degree to which the caller is known to place unwanted calls. In cases where a spam score has already been associated with the caller, server may, at step 1199, update the spam score according to the evaluation.

Figure 12:
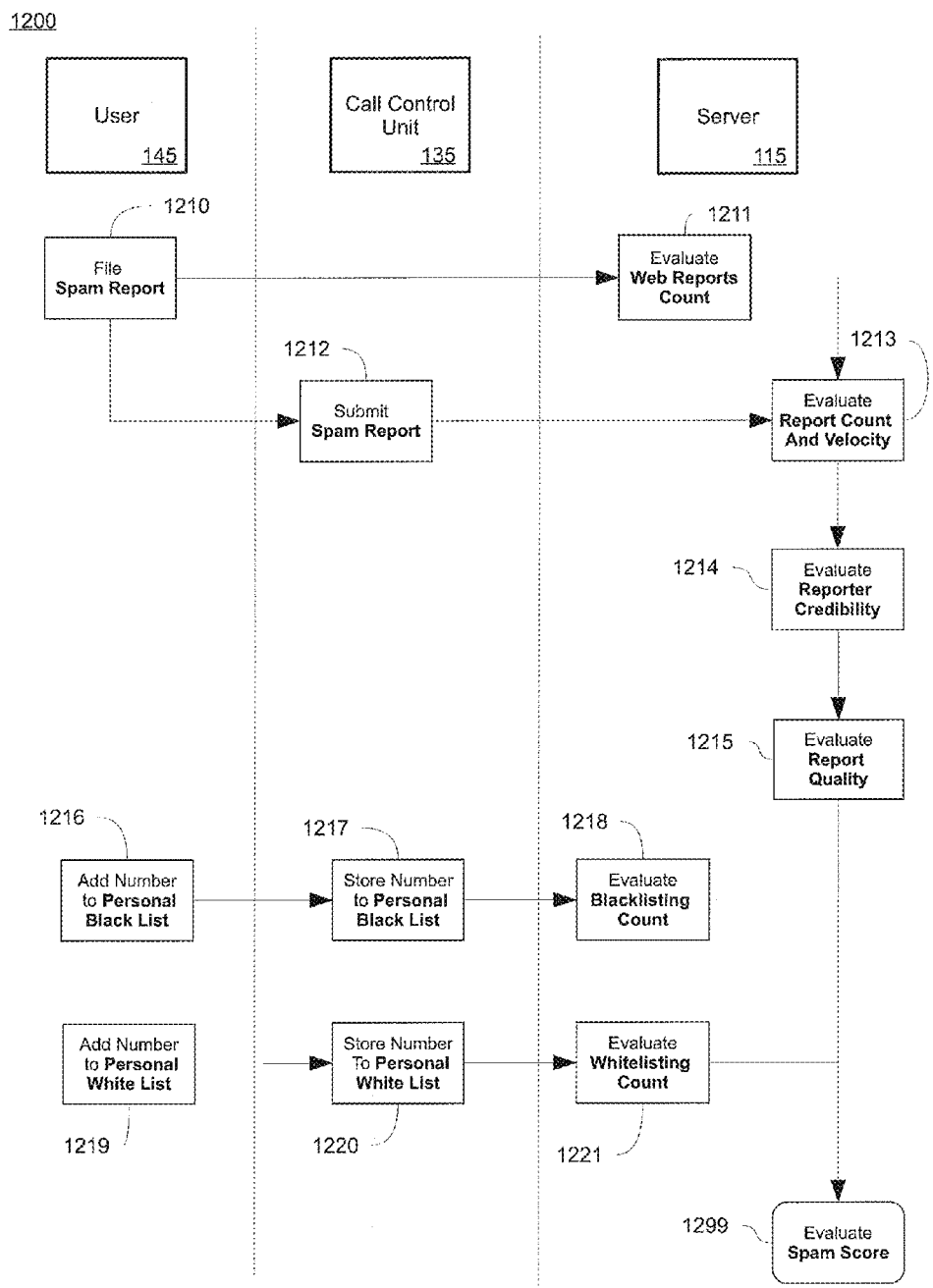

FIG. 12 depicts a process diagram illustrating an exemplary process 1200 for using a spam report submitted by a user to generate or modify a spam score for identification information or phone number(s) associated with an incoming call. Process 1200 may be executed by, for example, user 145, call control unit 135, and server 115, wherein at step 1210 a user generates and files a spam report. In some instances, communication between user 145, call control unit 135, and/or server 115 may be protected with a security protocol such as encryption. Exemplary user generated spam reports may include caller identification information (e.g., phone number), call type (e.g., telemarketer, potential danger of identity theft, etc.), and/or time of day call was received. The spam report may them be submitted to call control unit (step 1212) and/or communicated to server 115 (step 1211).

In some embodiments, user 145 may elect to add the caller's phone number to a personal blacklist (step 1216)

and, upon submitting this election to call control unit 135, call control unit 135 may then add the phone number to the user's personal blacklist stored on call control unit 135 (step 1217). Call control unit may also notify server 115 that the caller's phone number has been added to the user's blacklist.

In other embodiments, user 145 may elect to add the caller's phone number to a personal whitelist (step 1219) and, upon submitting this election to call control unit 135, call control unit 135 may then add the phone number to the user's personal whitelist stored on call control unit 135 (step 1220). Call control unit may also notify server 115 that the caller's phone number has been added to the user's whitelist.

In step 1299, server 115 may generate a spam score for the caller's identification information/phone number using one or more of the following evaluations: the number of spam reports associated with the caller's phone number (step 1211), the rate of receipt of incoming reports relating to the caller's phone number (step 1213), the credibility of user 145 (i.e., is the user know for submitting false or correct spam reports) (step 1214), the quality of the report (step 1215), wherein reports of a higher quality are weighted more highly than reports of lower quality, and/or the number of blacklists (step 1218) or whitelists (step 1221) the caller's phone number appears on. The evaluations may be weighted so that evaluations that are deemed more dispositive for evaluating a spam score are weighted more highly than other considerations.

Figure 13:
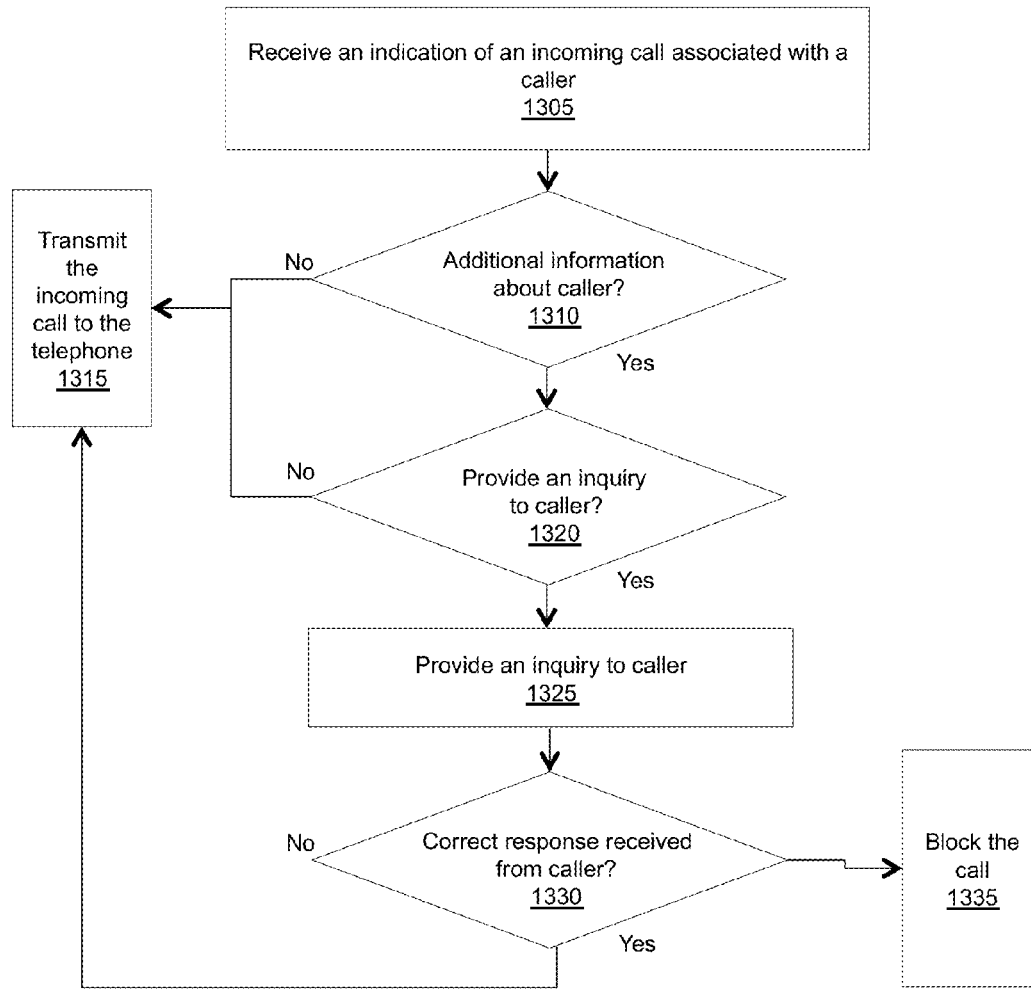
FIG. 13 is a flowchart depicting an exemplary process consistent with an embodiment of the invention.

FIG. 13 is a flow chart illustrating an exemplary process 1300 for providing an inquiry to a caller associated with additional information. Process 1300 may be executed by, for example, the systems and/or system components described herein such as call control unit 135 and/or server 115. In some embodiments, communication between call control unit 135, server 115, and/or other components described herein may be encrypted or otherwise protected with security protocols.

In step 1305, an indication of an incoming call directed to a telephone from a caller may be received by, for example, a call control unit such as call control unit 135. The call control unit may be communicatively coupled to, or resident within, the telephone and may be positioned between a telecommunication service provider providing the incoming call and the telephone. In most cases, the incoming call is associated with the caller's telephone number (i.e., a telephone number that is not a telephone number for the called telephone).

Next, a server and/or database coupled to the server (e.g., data store 120) may be queried by, for example, the call control unit to determine whether additional information associated with the telephone number and the caller exists (step 1310). Exemplary additional information includes, but is not limited to, a spam score, inclusion of the calling party on a called party's black list, inclusion of the calling party on a called party's white list, a location from which the call is made, an identity of a caller associated with the calling party's phone number, a mechanism via which a call is made (e.g., traditional PSTN or a VoIP call) and so on. In some circumstances, the additional information may be encrypted.

When no additional information exists and/or the additional information that does exist indicates that a person affiliated with the telephone would like to receive calls from the caller's telephone number (e.g., the caller's telephone number is on the called party's white list), the incoming call may be transmitted/forwarded to the telephone (step 1315).

When there is additional information then, it may be determined whether it is appropriate to provide an inquiry to the caller (step 1320). In some instances, the determination of step 1320 may include a determination of whether or not the additional information meets one or more criterion. For example, if a call meets, or exceeds, a threshold value for a spam score, then process 1300 may proceed to step 1325. In another example, if the additional information is a country of origin for the call, step 1320 may include a determination of whether the called party typically receives calls from the identified country of origin or whether the identified country of origin is a country known for providing unwanted calls (e.g., telemarketing calls or robo-calls) a call is known to have originated in a country other than the country in which the called party is located, then process 1300 may proceed to step 1325.

When it is not appropriate to provide an inquiry to the caller (step 1320) then the incoming call may be routed/transmitted to the telephone (step 1315). When it is appropriate to provide an inquiry to the caller (step 1320) then the caller may be provided with an inquiry at step 1325. The inquiry may be provided in an audio format and, in some embodiments, may include transmission of a question to be answered by the caller. In some circumstances, the inquiry may be a threshold inquiry to determine whether a person or a computer is the caller. For example, the inquiry may be as simple as "say your name" or "what state do you live in" and any answer, provided that is given by a person, may be correct/accurate. In some embodiments, the inquiry is compliant with a challenge-response authentication protocol such as Completely Automated Public Turing test to tell Computers and Humans Apart (CAPTCHA). An objective for posing the inquiry to the caller is to differentiate between computer-generated, or computerized autodialed calls, (so-called robocalls) and calls placed by a human being. A called party may wish to differentiate between these two types of calls because it is more likely that a robocall is an unwanted call than a call from a human being.

In step 1330, it may be determined whether a response to the inquiry is received and, if so, whether the response is correct/accurate. When the response received is correct/accurate, then the incoming call may be routed/transmitted to the telephone (step 1315). When the response received is not correct/accurate, then the incoming call may be blocked (step 1335). Blocking the call may include, but is not limited to, terminating the call, forwarding the call to an automated response mechanism, forwarding the call to a call-answering service, forwarding the incoming call to a voice mailbox, and answering the incoming call and then terminating the incoming call.

Hence, methods, systems, and devices for inbound call control have been herein described.

What is claimed is:

1. A method comprising:
   receiving an indication of an incoming call directed to a telephone from a caller at a call control unit communicatively coupled to, or resident within the telephone, the call control unit being between a telecommunication service provider providing the incoming call and the telephone, the incoming call being associated with the caller and a telephone number for the caller; and
   querying, by the call control unit, a server to determine whether additional information associated with the telephone number and the caller exists, and if so, determining whether the additional information indicates that a negative characteristic is associated with at least one of the caller and the telephone number and if so, providing an inquiry to the caller and, upon receipt of a correct response to the inquiry, routing the call to the telephone, otherwise, blocking the call.

2. The method of claim 1, wherein the inquiry is compliant with a challenge-response authentication protocol.

3. The method of claim 1, wherein the inquiry includes a Completely Automated Public Turing test to tell Computers and Humans Apart (CAPTCHA).

4. The method of claim 1, wherein the additional information is encrypted.

5. The method of claim 1, wherein communication between the call control unit and the server is encrypted.

6. The method of claim 1, wherein determining whether additional information regarding a caller associated with the identification information exists comprises:
   forwarding the identification information from the call control unit to a server, wherein the server is operative to determine whether the additional information regarding a caller associated with the identification information exists; and
   receiving from the server, if the additional information exists, the additional information regarding the caller associated with the identification information, otherwise receiving from the server an indication that no additional information exists.

7. The method of claim 1, wherein the additional information includes a user-configurable list of undesired callers.

8. The method of claim 1, further comprising:
   receiving an indication at the call control unit that the incoming call is undesired; and
   communicating, by the call control unit, the indication to the server.

9. The method of claim 1, wherein the additional information includes a user-configurable list of undesired callers, the method further comprising:
   receiving an indication at the call control unit that the incoming call is undesired; and
   automatically adding the identification information for the undesired incoming call to the user-configurable list of undesired callers.

10. The method of claim 1, wherein the additional information includes at least one of caller identification information and a spam score.

11. A call control unit comprising:
   an input for receiving an indication of an incoming call for a telephone from a telecommunication service provider, the incoming call being associated with the caller and a telephone number for the caller;
   a processor communicatively coupled to the input, the processor configured to query a server to determine whether additional information associated with the telephone number and the caller exists, and if so, determining whether the additional information indicates that a negative characteristic is associated with at least one of the caller and the telephone number and if so, providing an inquiry to the caller and, upon receipt of a correct response to the inquiry, routing the call to the telephone, otherwise, blocking the call; and
   a communication port configured to enable the call control unit to communicate with a telephone responsively to at least one of the first operation and the second operation.

12. The call control unit of claim 11, wherein the inquiry is compliant with a challenge-response authentication protocol.

13. The call control unit of claim 11, wherein the inquiry includes a Completely Automated Public Turing test to tell Computers and Humans Apart (CAPTCHA).

14. The call control unit of claim 11, wherein the additional information is encrypted.

15. The call control unit of claim 11, wherein communication between the call control unit and the server is encrypted.

16. The call control unit of claim 11, further comprising:
   a memory communicatively coupled to the processor, the memory being configured to store the additional information.

17. The call control unit of claim 11, wherein the additional information includes a user-configurable list of undesired callers.

18. The call control unit of claim 11, wherein the input is further configured to receive an indication that the incoming call is undesired and the processor is further configured to communicate the indication to a server.

19. The call control unit of claim 11, wherein the additional information includes a user-configurable list of undesired callers, the input is configured to receive an indication at the call control unit that the incoming call is undesired and the processor is further configured to automatically add the identification information for the undesired incoming call to the user-configurable list of undesired callers.

20. A system comprising:
   a telephone network communicatively coupled to a call control unit, the telephone network being configured to transfer an incoming call to a call control unit communicatively coupled to or resident within a telephone and positioned between a telecommunication service provider providing the incoming call and the telephone;
   the call control unit configured to receive an indication of the incoming call, the incoming call being associated with a caller and a telephone number for the caller, the call control unit being further configured to query a server to determine whether additional information regarding a caller associated with the telephone number and the caller exists and, if so, determining whether the additional information indicates that a negative characteristic is associated with at least one of the caller and the telephone number and if so, providing an inquiry to the caller and, upon receipt of a correct response to the inquiry, transferring the incoming call to the telephone otherwise, blocking the call; and
   the telephone for receiving the incoming call from the call control unit.

21. The system of claim 20, wherein the call control unit is further configured to request the additional information from a server, the system further comprising:
   a database configured to store the additional information; and
   the server communicatively coupled to the call control unit and the database, the server being configured to transmit a request to the database for the additional information, receive the additional information from the database, and transmit the received additional information to the call control unit.

22. The system of claim 20, wherein the inquiry is compliant with a challenge-response authentication protocol.

23. The system of claim 20, wherein the inquiry includes a Completely Automated Public Turing test to tell Computers and Humans Apart (CAPTCHA).

24. The system of claim 20, wherein the additional information is encrypted.

25. The system of claim 20, wherein communication between the call control unit and the server is encrypted.

* * * * *